United States Patent [19]

Easton

[11] 4,297,991
[45] Nov. 3, 1981

[54] SOLAR COLLECTOR DEVICE

[75] Inventor: Anthony Easton, Old Saybrook, Conn.

[73] Assignee: National Solar Corporation, Centerbrook, Conn.

[21] Appl. No.: 151,656

[22] Filed: May 20, 1980

Related U.S. Application Data

[60] Continuation of Ser. No. 936,192, Aug. 24, 1978, abandoned, which is a division of Ser. No. 795,143, May 9, 1977, abandoned, which is a continuation-in-part of Ser. No. 690,362, May 26, 1976, abandoned.

[51] Int. Cl.³ .............................................. F24J 3/02
[52] U.S. Cl. .................................. 126/448; 126/417; 126/428; 126/442
[58] Field of Search ............... 126/446, 448, 442, 417, 126/432, 428; 29/527.6, 157.3 R

[56] References Cited

U.S. PATENT DOCUMENTS

| | | | |
|---|---|---|---|
| 2,553,302 | 5/1951 | Cornwall | 126/442 X |
| 3,221,012 | 5/1967 | Hervey | 126/442 |
| 3,239,000 | 3/1966 | Meagher | 126/442 |
| 3,789,915 | 2/1974 | Ford | 165/133 X |
| 4,031,881 | 6/1977 | Thiel | 165/171 X |

Primary Examiner—Larry Jones
Attorney, Agent, or Firm—Paul W. Garbo

[57] ABSTRACT

A solar collector device having a plurality of parallel collector tubes mounted between a pair of header members through which a heat carrying liquid flows. The collector tubes each have a plane surface exposed to the solar rays and extending laterally substantially equal to the maximum diameter of the respective tubes. The edges of adjacent tubes abut each other to form a substantially continuous planar collector surface. The tubes are moreover, made of a highly efficient conductor of thermal energy, namely a specialized copper alloy. A method of forming such tubes with planar surfaces for use in solar energy collectors is also disclosed.

1 Claim, 20 Drawing Figures

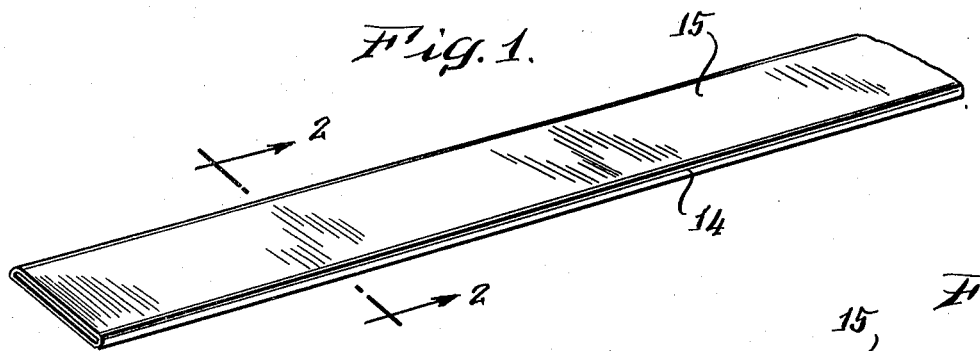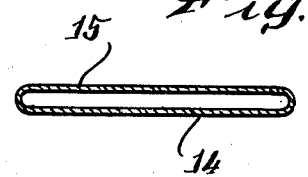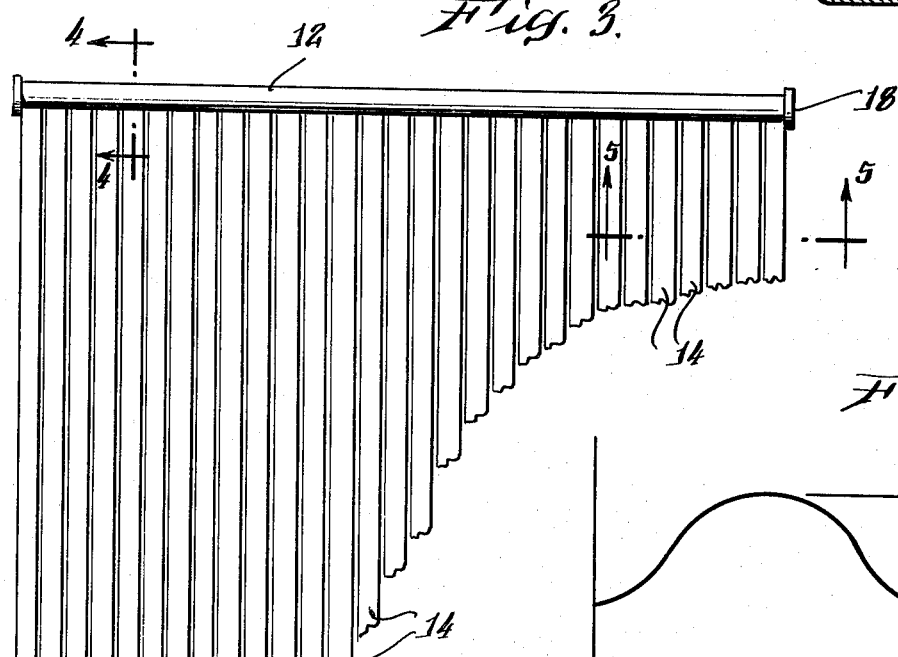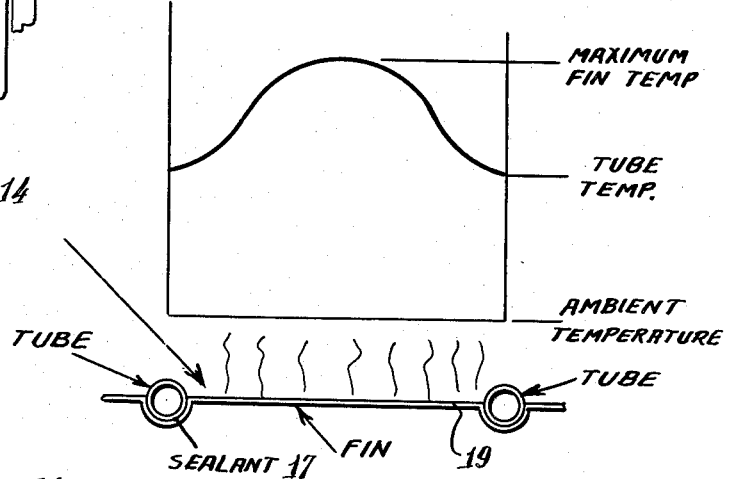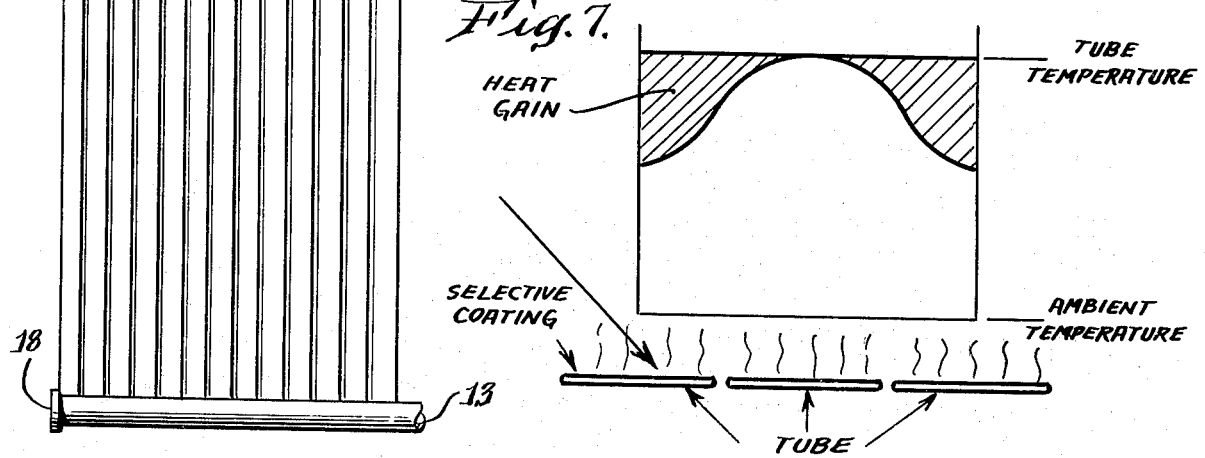

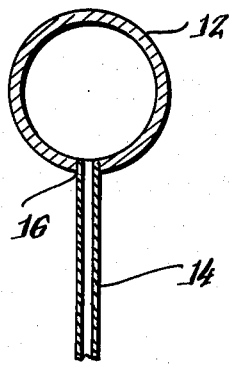
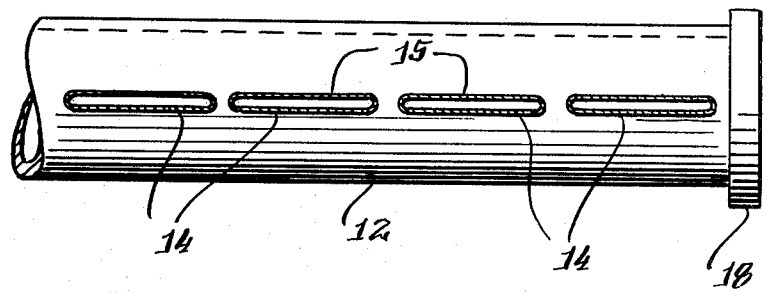
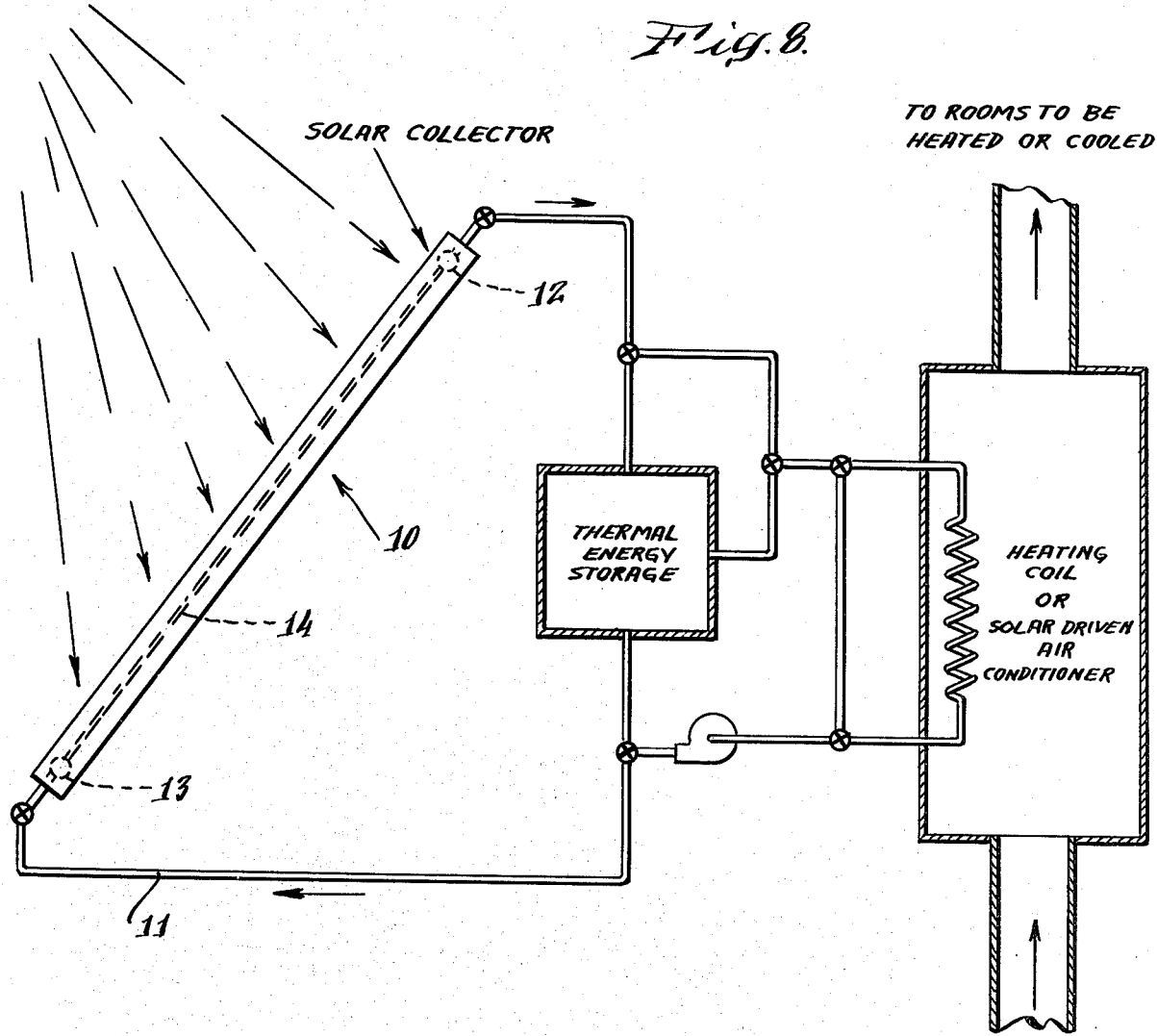

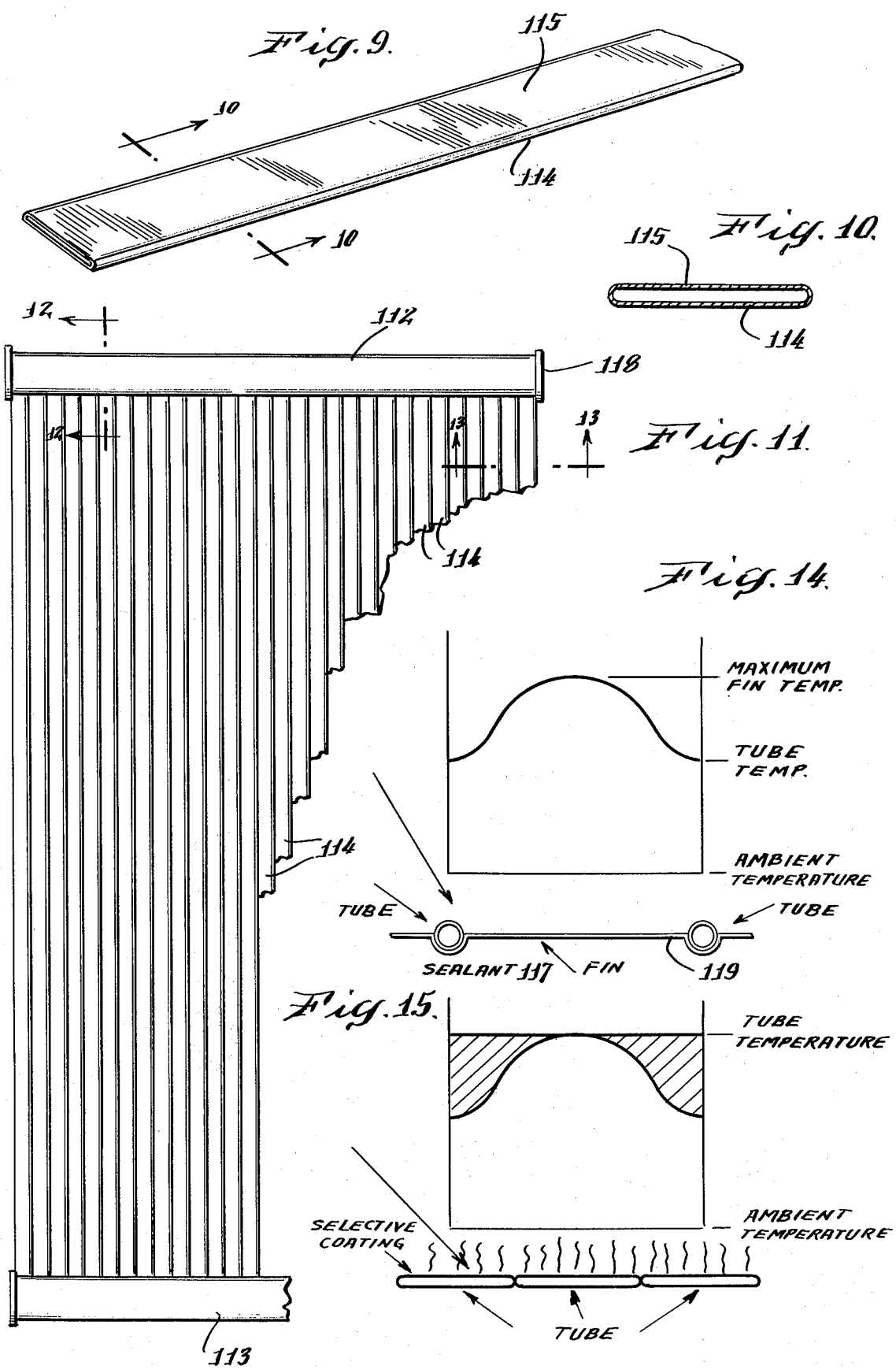

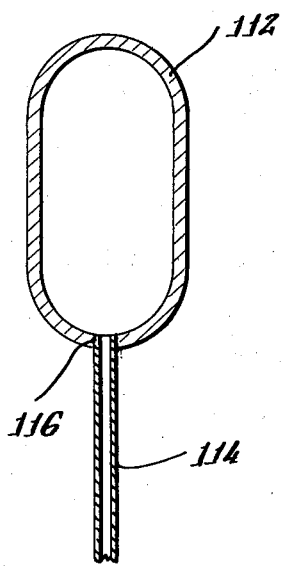
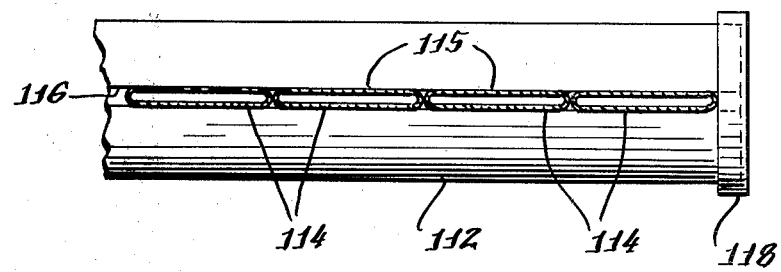
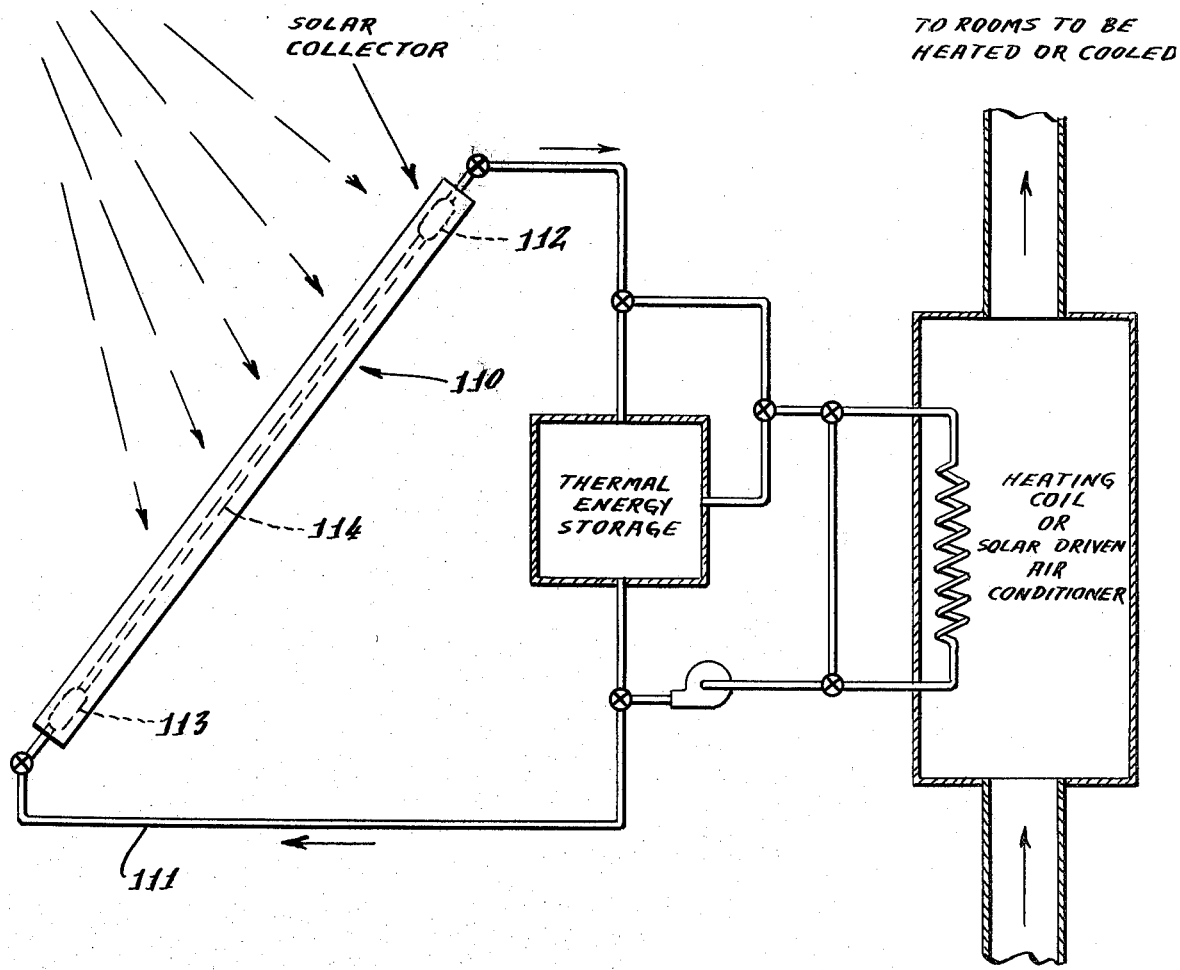

SOLAR COLLECTOR DEVICE

This is a continuation of application Ser. No. 936,192 filed Aug. 24, 1978 which was a division of application Ser. No. 795,143, filed May 9, 1977, which was a continuation-in-part of application Ser. No. 690,362, filed May 26, 1976 all now abandoned.

BACKGROUND OF THE INVENTION

Solar energy systems basically contain a solar collector which is exposed to the sun and through which a liquid is pumped to absorb the heat energy from the sun's rays and carry it to the desired area where the heat is to be used or stored.

To provide for rapid absorption of the solar ray energy, solar collectors are made with a number of metal tubes connected in parallel between headers so that their surface areas may be exposed to the sun's rays and the liquid flowing therein be enabled to collect the heat or solar energy.

Metal fins are sometimes attached between the tubes, when spaced apart, to collect any additional solar rays which might otherwise go between or around the individual tubes. A sealing means may be used to bond the fins to the respective tubes.

Other specific examples of solar energy collectors are given in U.S. Pat. Nos. 3,987,784 (Godrick); 3,239,000 (Meagher); 3,934,323 (Ford et al); and 2,390,659 (Snyder).

SUMMARY OF THE INVENTION

The invention comprises an improvement in the solar collector that employs a tube surface exposed to the solar rays which comprises a plane surface eliminating fins and bonding material between fins and tubes and hence enabling the use of more tubes per unit of collector area and thus heats more liquid. Furthermore, this arrangement enables more solar heat rays to directly reach the carrier liquid in the tube as compared to the distance the heat would necessarily have to be conducted by the fin area which is not in direct contact with the carrier liquid within the tube. Graphs showing the heat saved in a typical solar connector are shown in one of the drawings hereinafter.

The improvement also comprises a solar energy collector which is constructed of a highly efficient solar energy conductor, specifically a copper alloy described in greater detail below.

A method of forming tubes with planar solar energy collecting surfaces is also disclosed. This method generally comprises the steps of compressing a cylindrical tube which carries an elongated flat-surfaced mandrel in its interior, between two elongated dies having opposed substantially parallel faces. The mandrel may be pushed from the formed tubing after the compressing step.

Accordingly it is an object of the present invention to provide an efficient solar energy collector and an improved method for forming various collector components.

Other objects aspects and advantages will be pointed out in or will be understood from the detailed description provided below in conjunction with the following drawings.

DETAILED DESCRIPTION OF PREFERRED EMBODIMENTS OF THE INVENTION

Figure 17:
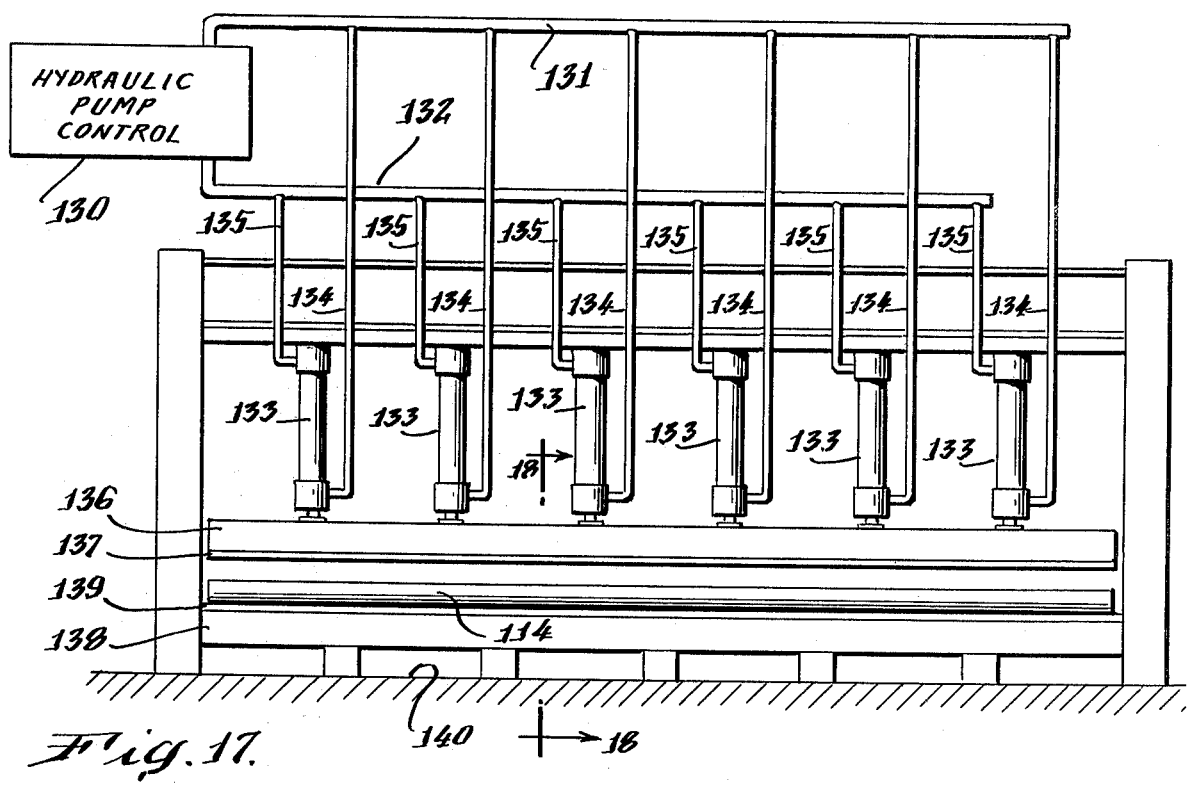
Figure 18:
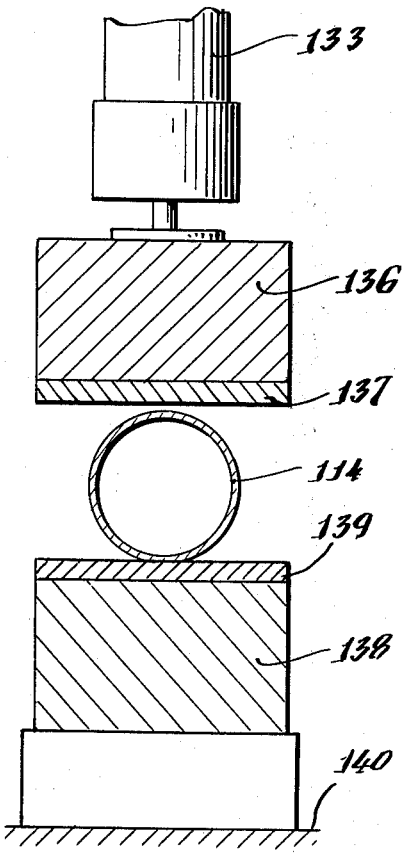
Figure 19:
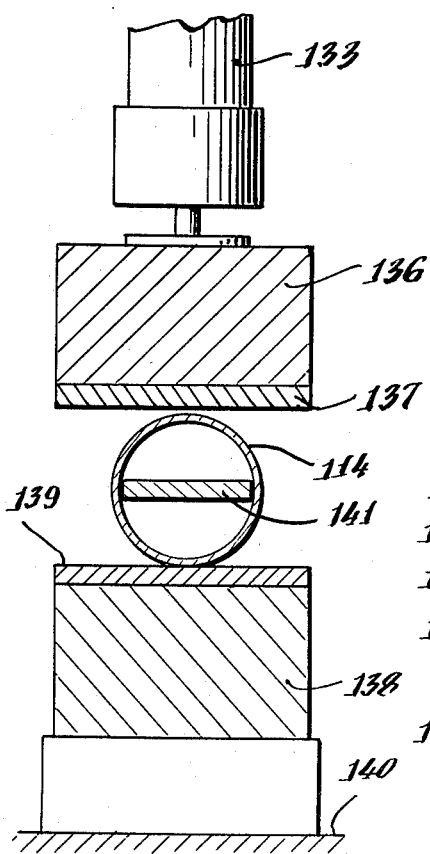
Figure 20:
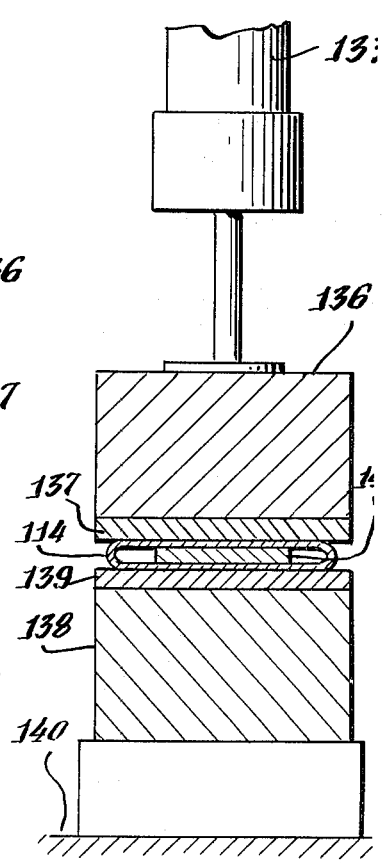

FIG. 1 is a perspective view of one of the solar collector tubes,

FIG. 2 is a cross-sectional view of one of the solar collector tubes taken on line 2—2 of FIG. 1, FIG. 3 is a plan view of the assembled solar collector, FIG. 4 is a cross-sectional view somewhat enlarged taken on line 4—4 of FIG. 3, FIG. 5 is a cross-sectional view somewhat enlarged taken on line 5—5 of FIG. 3, FIG. 6 is a plotted graph showing fin and tube temperatures of a conventional solar collector, positioned above a typical fin-tube assembly shown in cross-section, FIG. 7 shows plotted graphs of fin and tube temperatures of a conventional collector compared to temperatures of a plane surface flat tube collector, positioned above a cross-sectional view of the collector, hereinafter described and claimed, FIG. 8 is a schematic diagram showing the relation of the solar collector to the heating system as a whole, FIG. 9 is a perspective view of one of the solar energy collecting tubes used in a second embodiment of the invention, FIG. 10 is a cross-sectional view taken on line 10—10 in FIG. 9, FIG. 11 is a partial plan view of the assembled collector of this second embodiment, FIG. 12 is an enlarged cross-sectional view taken on line 12—12 in FIG. 11, FIG. 13 is an enlarged cross-sectional view taken on line 13—13 in FIG. 11, FIG. 14 is a graph of fin and tube temperature of a prior art solar energy collector showing the temperature of various positions on the collector, FIG. 15 is a second graph showing the temperature at various positions on the second embodiment of the invention, FIG. 16 is a schematic diagram of a solar energy collecting system similar to FIG. 8, FIG. 17 is a front elevational view, shown in part schematically, of an apparatus for forming tubes for assembly into solar collectors in accordance with the invention, FIG. 18 is a horizontal cross-sectional view taken through line 18—18 in FIG. 17, FIGS. 19 and 20 are horizontal cross-sectional views similarly to FIG. 18 showing a tube at various stages of the formation process.

Referring to FIG. 8, the numeral 10 denotes the solar collector mounted in position to receive solar rays and a schematic diagram of the connections to convey the heat absorbing liquid 11 from the solar collector 10 to the desired location or locations where the heat is to be used and the liquid 11 returned to the solar collector 10 for reheating and recirculation.

FIG. 3 shows an assembled solar collector 10 comprising an entrance header 13 and an exit header 12 connected by a battery of individual heat absorbing collector tubes 14.

The collector tubes 14 have a flat or plane face 15 exposed to the solar rays. For convenience in manufacturing, flat tubes may be used as shown most clearly in FIG. 1 and FIG. 2.

The flat tubes 14 are inserted in corresponding slots 16 in the headers 12 and 13 and sealed by brazing, soldering or the like and form the assembled collector as shown in FIG. 3.

Referring now to FIG. 5 and FIG. 7 in particular, it will be seen that most of the solar rays strike a plane surface 15 on one side of the tube wall and on the immediate opposite side is a flowing liquid 11 to receive and absorb the solar heat energy instantly.

Referring now to FIG. 6, it will be observed that the solar rays strike a convex tube surface and more importantly strike a flat fin surface which must carry the solar heat to the nearest tube and its cross sectional area engaging the tube wall is limited by the cross sectional thickness of the fin 19 (FIG. 6) and the bonding material which latter has a relatively low heat conducting ability between the fin and the tube resulting in a substantial loss in efficiency in transmitting the solar heat to the flowing liquid 11. Conversely the heat gain by the flat surface tube is shown by the graph plot in FIG. 7.

In another embodiment of my invention instead of using a flat collector tube 14 I may use a tube having a rectangular or triangular cross section in which a flat or plane surface is presented to receive the solar rays.

A second embodiment of the present invention is illustrated in FIGS. 9 through 16. This second embodiment also comprises a pair of spaced headers 112 and 113 connected by a plurality of flattened tubes 114 (FIGS. 9 and 10). Adjacent tubes abut each other along adjacent longitudinal edges as shown in FIGS. 11 and 13.

Each header 112 and 113 has a continuous slot cut axially therealong to receive the ends of the tubes 114 which are sealed thereto by any suitable means such as soldering welding, or brazing. In this manner, the headers and interconnecting tubes may be economically assembled. Moreover, the total tube assembly defines a large substantially continuous and planer area exposed to solar radiation as shown in FIGS. 13 and 16.

The interconnecting tube 114 are preferably made of a material which efficiently conducts heat energy. As suitable material, disclosed in U.S. Pat. No. 3,789,915 (Ford), assigned to Olin Corporation, is a copper alloy containing 0.5 to 4.0 percent iron, the balance of the alloy being copper. This material also has sufficient ductility to be formed into flattened tubes by a method described below. Further, the material is resistant to damage by the high temperatures experienced in the collector which can exceed 450° F.

The uniformity of energy collection across the surface of the collector, as represented by the collector surface temperature, is illustrated by the horizontal line labeled "tube temperature" in FIG. 15. The improvement in efficiency is illustrated by comparison of the surface temperature of a prior art collector, shown in FIG. 14, with the example shown in FIG. 15. Therefore, the hatched area in FIG. 15 represents the increase in energy collection per unit collector area of the invention over the prior art fin type collector.

To economically produce the desired plane surfaced tubes described above without destroying planar alignment or weakening the tube wall, a hydraulic pressure method is employed. As shown in FIGS. 17 through 20 a steel mandrel 141 having planar upper and lower surfaces is inserted in an elongated cylindrical tube 114. The assembly is placed between a movable planar die 136 having, for example, an oak strip liner 137 and a stationary die 138 having a similar liner 139. A series of hydraulic cylinders 133, which receive energy from a suitable hydraulic pump and control 130 through conduits 134, force the upper die toward the lower die thereby compressing the tube 114 about mandrel 141. After compression, the upper die is moved away from the flattened tube after pressure in cyinders 133 is relieved through relief conduits 135. After tube formation in the press, the mandrel may be pressed or pushed from the interior of the flattened tube.

By using a battery of hydraulic cylinders 133, pressure may be uniformly applied to an elongated tube along its entire length. Thus a continuous planar surface results for easy tube assembly with the headers 112 and 113.

What is claimed is:

1. In a solar heating system using a moving liquid medium for collecting heat energy as the liquid medium flows through a solar energy collector device, the improvement in said collector device comprising:
   (a) a substantially continuous planar surface for collecting solar energy provided exclusively by a plurality of tubes formed from copper tubing with not more than 4.0 percent iron which has been flattened to substantially its maximum diameter to provide two flat faces with an intervening flat passageway for the liquid medium, said passageway having a smooth uninterrupted surface of uniform thickness, and said tubes being disposed in diametric abutting relation to one another to present said substantially continuous planar surface for collecting solar energy;
   (b) a first header member having a longitudinal slot into which one end of the flattened and abutting tubes is inserted and connected thereto to seal said slot; and
   (c) a second header member having a longitudinal slot into which the other end of the flattened and abutting tubes is inserted and connected thereto to seal said slot.

* * * * *